US012529251B1

(12) United States Patent
Twyman

(10) Patent No.: US 12,529,251 B1
(45) Date of Patent: Jan. 20, 2026

(54) EDGE-MOUNTABLE VENTILATION APPARATUS FOR DOORS AND WINDOWS

(71) Applicant: Mark Twyman, Wyndmoor, PA (US)

(72) Inventor: Mark Twyman, Wyndmoor, PA (US)

( * ) Notice: Subject to any disclaimer, the term of this patent is extended or adjusted under 35 U.S.C. 154(b) by 0 days.

(21) Appl. No.: 19/318,458

(22) Filed: Sep. 4, 2025

(51) Int. Cl.
*E05C 17/54* (2006.01)

(52) U.S. Cl.
CPC .................................... *E05C 17/54* (2013.01)

(58) Field of Classification Search
CPC ....................................................... E05C 17/54
See application file for complete search history.

(56) References Cited

U.S. PATENT DOCUMENTS 5,675,865 A * 10/1997 van der Steur ..... B05B 13/0292 16/374
5,692,264 A * 12/1997 van der Steur ..... B05B 13/0292 16/374
6,135,516 A * 10/2000 Gasperino ............. B62B 3/1428 280/47.27
6,948,214 B2 * 9/2005 Spalding ............. E05D 11/1085 16/83
D682,081 S * 5/2013 Crawford ........................ D8/402
10,094,158 B2 * 10/2018 McRoskey ................ E05F 5/06
10,801,238 B1 * 10/2020 Cox ...................... E05C 17/025
D924,675 S * 7/2021 Potter ..................... E05C 17/54 D8/402
12,018,519 B2 * 6/2024 Salcido ................. E05C 19/184
2008/0224484 A1 * 9/2008 Yates ...................... E05C 17/54 292/262
2010/0050377 A1 * 3/2010 Ritachka .................. E05F 5/04 16/83
2011/0265388 A1 * 11/2011 Salgado ................ E06B 7/2303 49/493.1
2013/0118087 A1 * 5/2013 Belyea .................. E05C 17/025 49/506

* cited by examiner

*Primary Examiner* — Mark A Williams
(74) *Attorney, Agent, or Firm* — Daniel Polk

(57) ABSTRACT

An edge-mountable apparatus includes an engagement portion configured to couple to an edge of a door or window and a support portion extending from the engagement portion. The support portion is configured to engage an adjacent surface to maintain the door or window in an open position and allow airflow between an enclosed area and an adjacent space. The apparatus may include a top surface area, a bottom surface area, and a lateral exterior surface area comprising multiple lateral exterior sides. Some embodiments further include a lateral interior surface area defining a space for hanging the apparatus when not in use. The apparatus can maintain a ventilation gap of at least two inches and may be hung on a wall-mounted hanging element.

8 Claims, 7 Drawing Sheets

EDGE-MOUNTABLE VENTILATION APPARATUS FOR DOORS AND WINDOWS

FIELD OF INVENTION

The present invention relates generally to ventilation systems for enclosures and, more specifically, to devices that maintain doors or windows in an open position to facilitate airflow and moisture evaporation.

BACKGROUND OF THE INVENTION

In residential and commercial environments, ventilation is important for maintaining air quality, reducing humidity, and preventing mold buildup, particularly in confined areas such as bathroom shower enclosures. Doors and windows are often left ajar to facilitate airflow, but without a proper device to hold them open, they may close unintentionally. Existing devices, such as wedge-shaped doorstops or simple blocks, may be limited in versatility, may not be well-suited for use with glass shower door structures, and may not provide convenient storage options.

Accordingly, there is a need for a compact, versatile apparatus that can be removably mounted to the edge of a door or window and configured to maintain it in an open position to allow ventilation, without requiring alteration or impacting the structural or cosmetic integrity of the door or window, while also enabling convenient hanging or storage when not in use

SUMMARY

The present invention provides an edge-mountable apparatus configured to couple to a door or window edge and hold it in an open position to facilitate ventilation from an enclosed area defined by the door or window to an adjacent space. The apparatus includes an engagement portion, which secures to the edge of the door or window, and a support portion that extends from the engagement portion and contacts an adjacent surface such as a wall, frame, or structural stop. This interaction maintains the desired ventilation gap.

In some embodiments, the apparatus further includes a top surface area, bottom surface area, and a lateral exterior surface area composed of multiple lateral exterior sides, some of which form part of the engagement portion, while others constitute the support portion. In certain implementations, a lateral interior surface area defines a cavity or gap that enables the apparatus to be hung using a hanging element, such as a wall hook, when not in use. Variations of the apparatus may include rounded, pointed, or mixed vertex geometries, as well as configurations that permit the door or window to remain open by a specific distance, such as two inches, to achieve effective ventilation.

DESCRIPTIVE KEY

Figure 1:
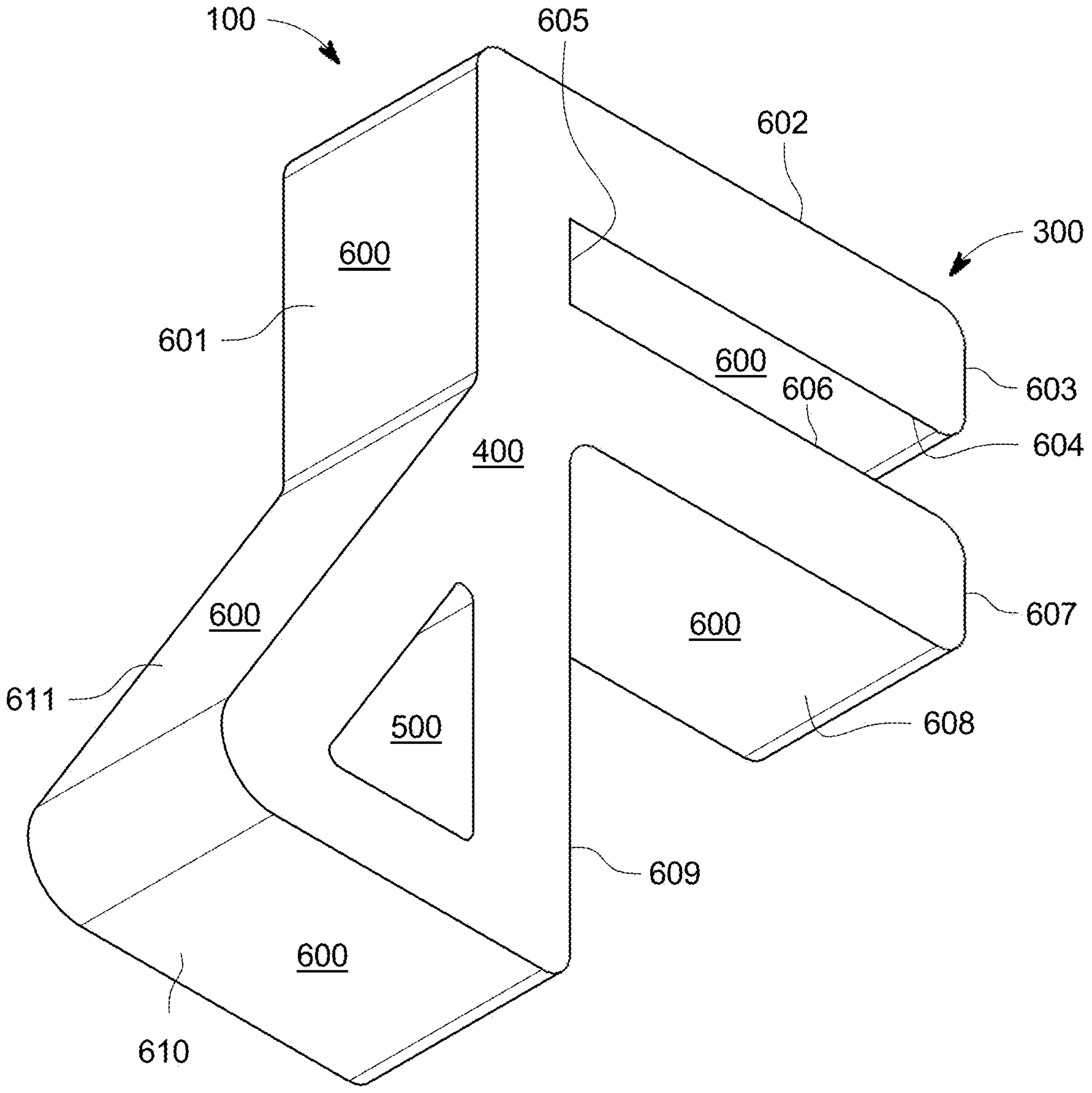
FIG. 1 is a perspective view of an embodiment of an edge-mountable apparatus.

100 edge-mountable apparatus
200 a support portion
300 engagement portion
400 top surface area
500 lateral interior surface area
501-503 lateral interior sides
600 lateral exterior surface area
601-611 lateral exterior sides
700 bottom surface area
801 shower door edge
802 supported door
900 wall-mounted hanging element

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Unless otherwise defined, all technical and scientific terms used herein have the same meaning as commonly understood by one of ordinary skill in the art. In case of conflict, the present disclosure, including any definitions provided herein, shall control. The materials, methods, and examples disclosed herein are illustrative only and are not intended to be limiting. Methods and materials similar or equivalent to those described herein can be used in the practice or testing of the disclosed invention. All publications, patent applications, patents, and other references mentioned herein are incorporated by reference in their entirety, to the extent that they do not conflict with the disclosure provided in this document. As used in this application, the terms "comprise(s)," "include(s)," "having," "has," "can," "contain(s)," and variants thereof are intended to be open-ended transitional phrases or terms that do not preclude the presence of additional elements or steps. The singular forms "a," "an," and "the" also include plural forms unless the context clearly dictates otherwise. The present disclosure also contemplates embodiments comprising, consisting of, or consisting essentially of the elements or features described herein, whether explicitly set forth or not.

Figure 2:
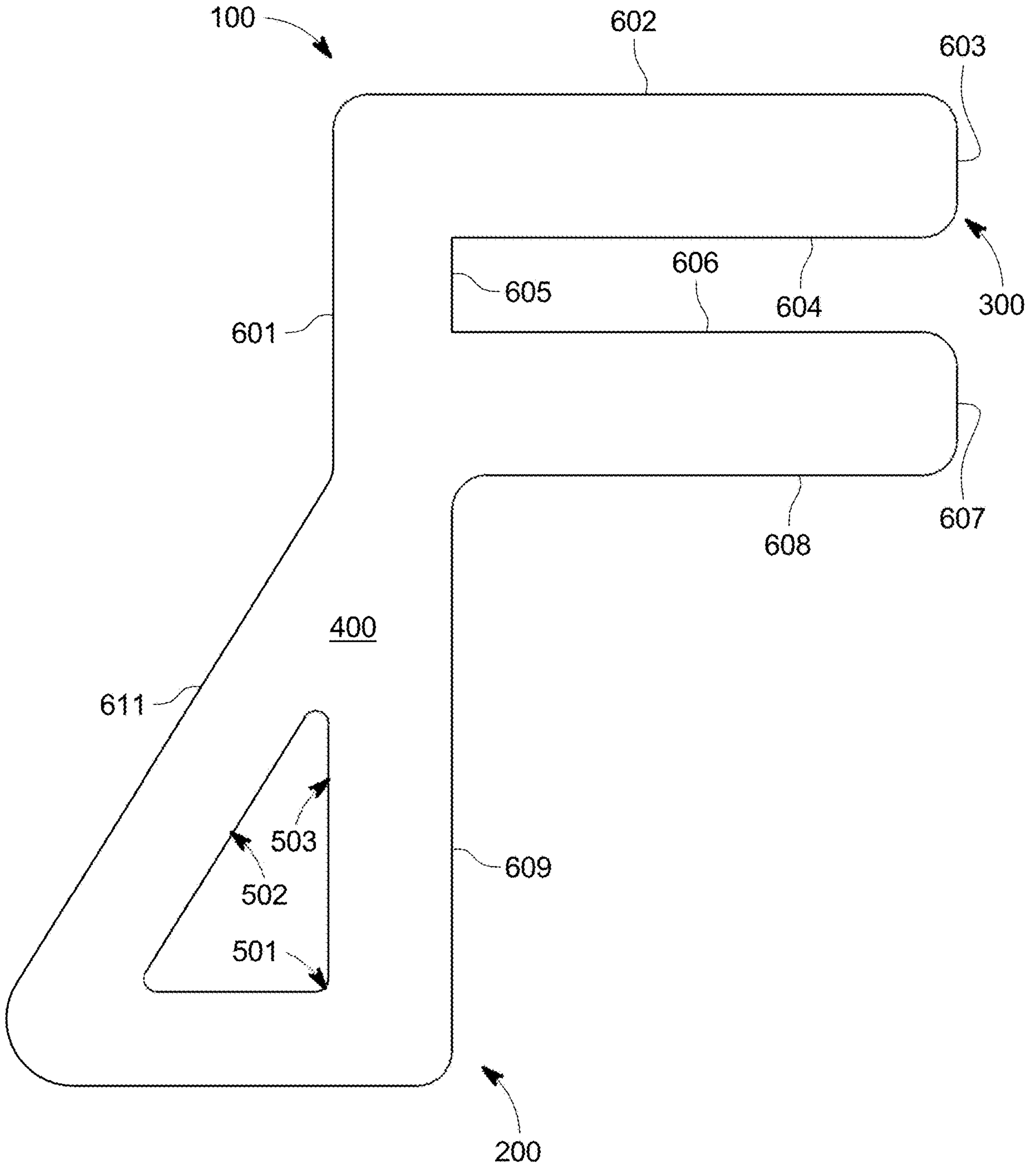
FIG. 2 is a top plan view of an embodiment of an edge-mountable apparatus.
Figure 3:
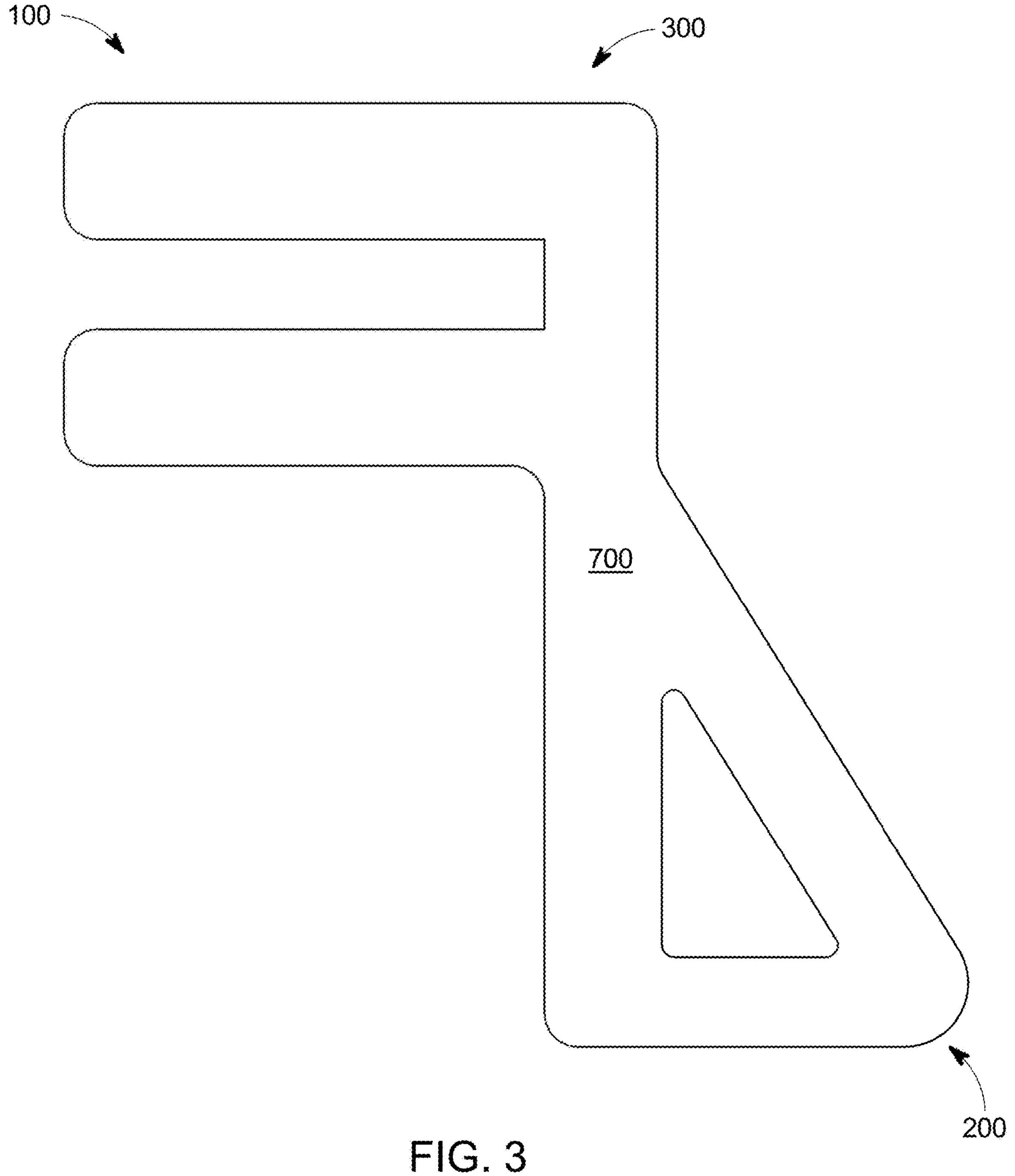
FIG. 3 is a bottom plan view of an embodiment of an edge-mountable apparatus.
Figure 4:
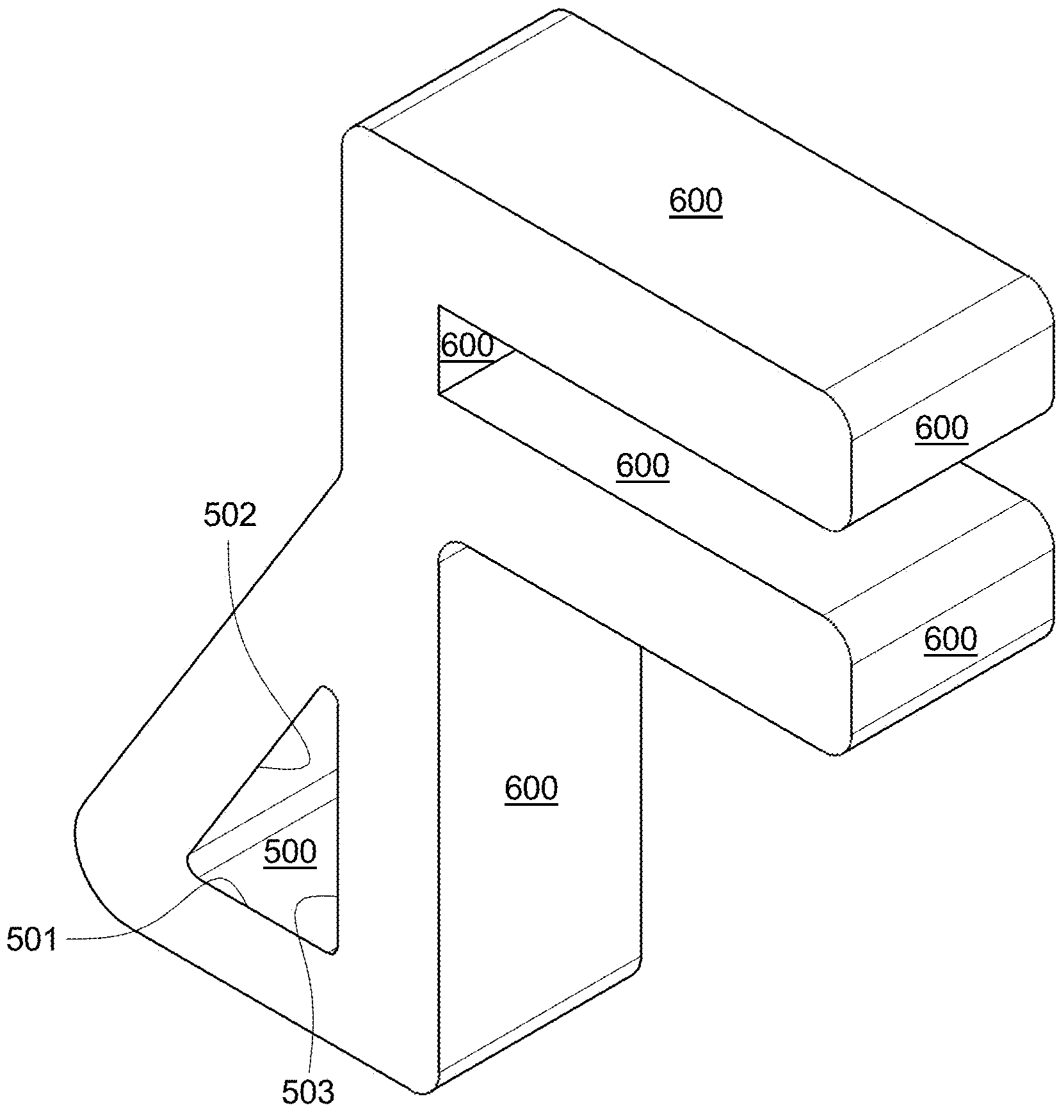
FIG. 4 is another perspective view of an embodiment of an edge-mountable apparatus.
Figure 5:
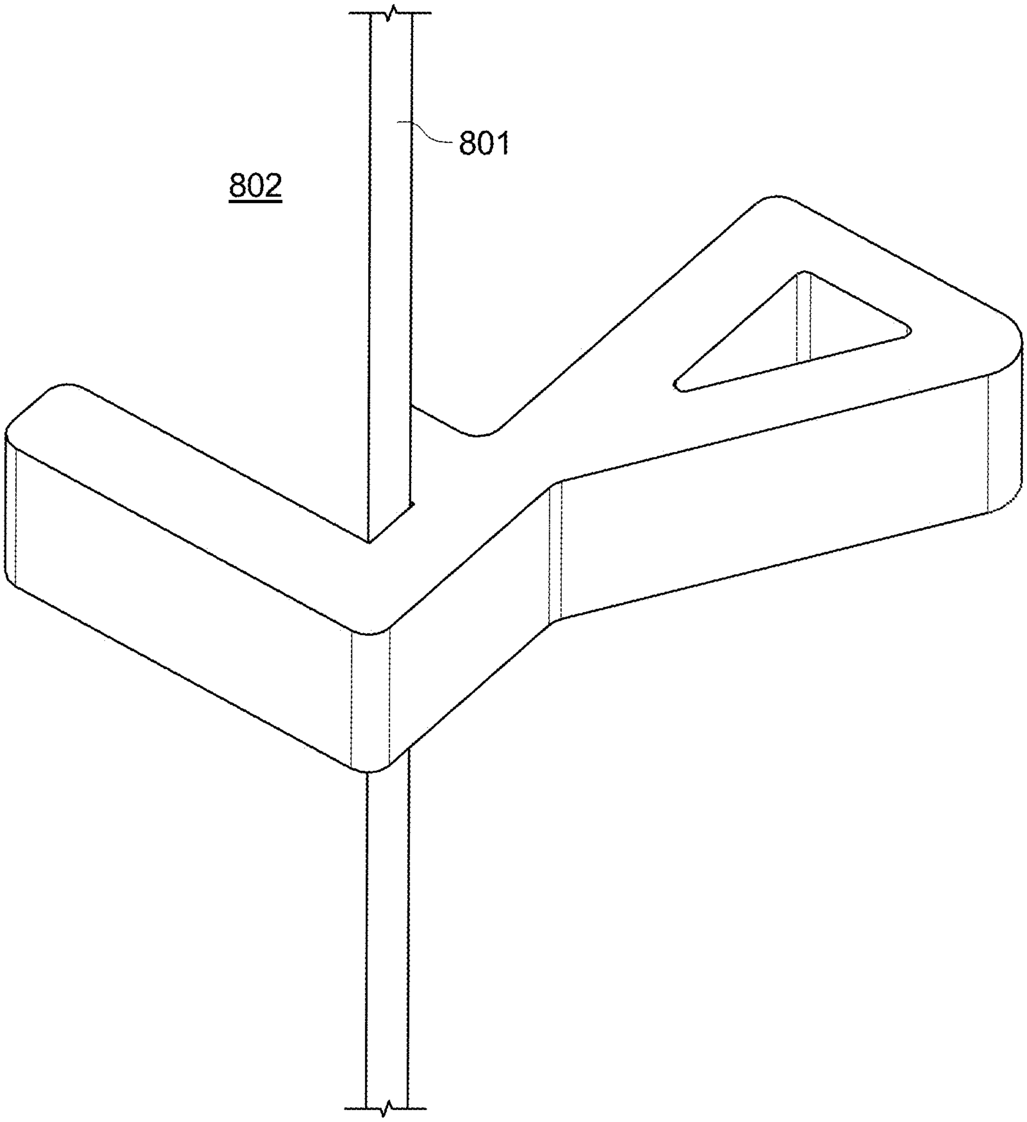
FIG. 5 is another perspective view of an embodiment of an apparatus engaged with a glass shower door edge.
Figure 6:
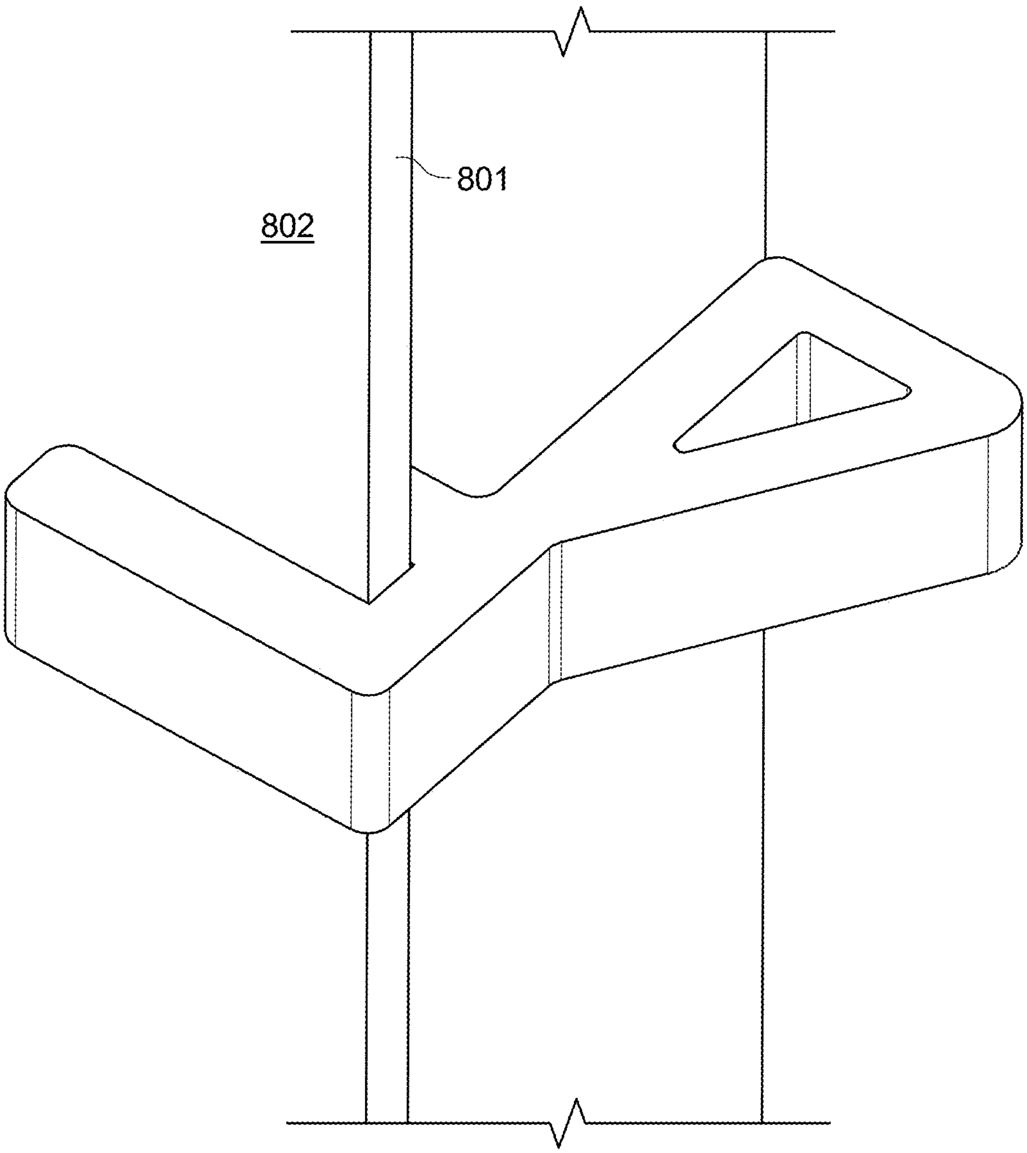
FIG. 6 is a perspective view of an embodiment of an edge-mountable apparatus engaged with a glass shower door edge and supporting the door in an open position for ventilation.
Figure 7:
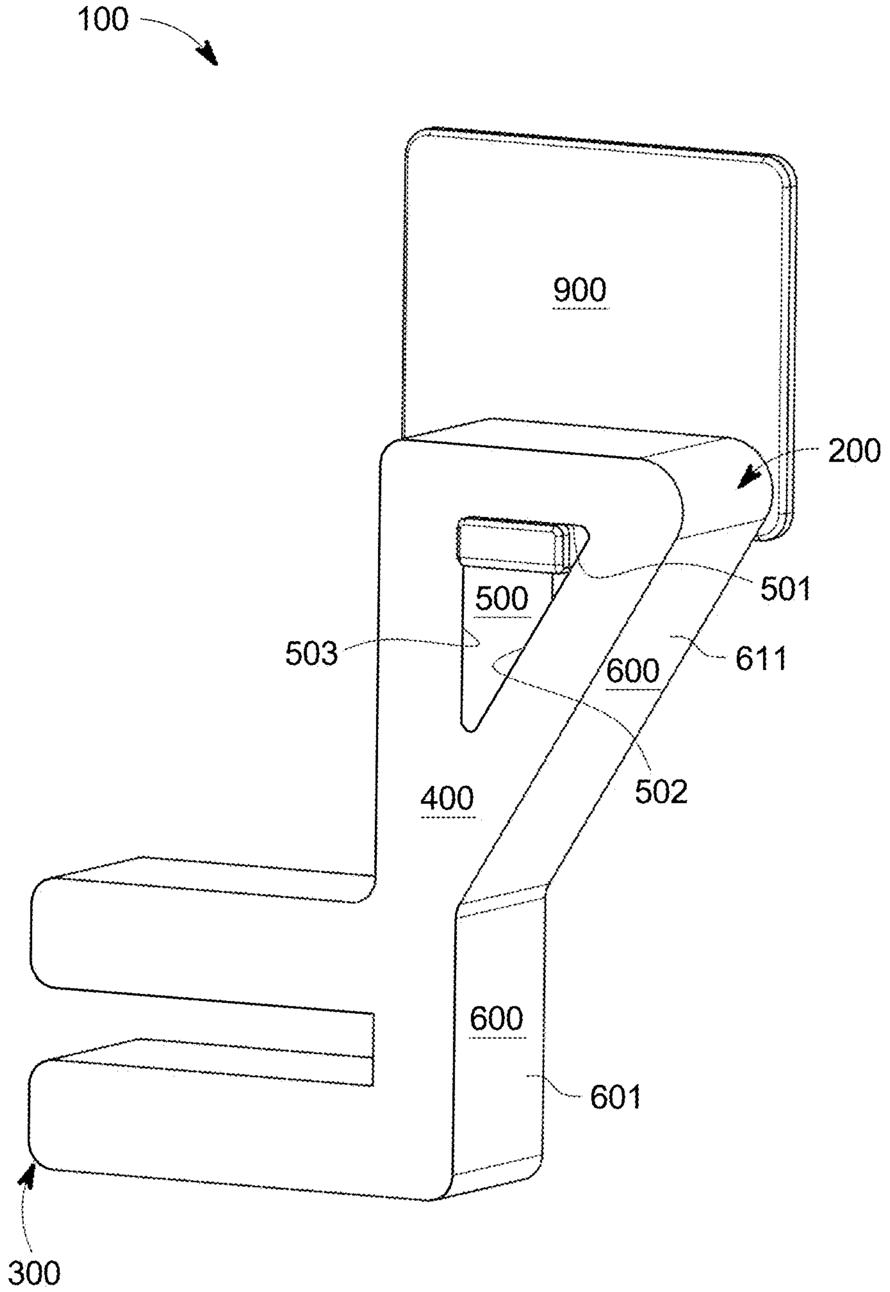
FIG. 7 is a perspective view of an embodiment of an edge-mountable apparatus being hung on a wall-mounted hanging element for convenient storage.

FIG. 1 is a perspective view of an embodiment of an edge-mountable apparatus (100). As seen in FIG. 1, the apparatus may include an engagement portion 300, a top surface area 400, a lateral interior surface area 500, and a lateral exterior surface area 600. The lateral exterior surface area 600 may further comprise a plurality of lateral exterior sides 601-611. FIG. 2 is a top plane view of an embodiment of an edge-mountable apparatus (100). As seen in FIG. 2, the apparatus may further include one or more lateral interior sides 501-503 associated with the lateral interior surface area, and a support portion 200 extending from the engagement portion. FIG. 3 is a bottom plan view of an embodiment of an edge-mountable apparatus (100). As seen in FIG. 3, the apparatus may further include a bottom surface area 700 positioned opposite the top surface area. FIG. 4 is another perspective view of an embodiment of an edge-mountable apparatus (100). FIG. 5 is another perspective view of an embodiment of an edge-mountable apparatus (100) engaged with a glass shower door edge (801). As seen in FIG. 5, the apparatus may be in connection with a shower door edge (801) of a supported door (802). FIG. 6 is a perspective view of an embodiment of an edge-mountable apparatus (100) engaged with a glass shower door edge (801) and supported the door (802) in an open position for ventilation. FIG. 7 is a perspective view of an embodiment of an edge-mountable apparatus (100) being hung on a wall-mounted hanging element (900) for convenient storage. As seen in FIG. 7, the apparatus may also be shown in combination with a wall-mounted hanging element (900).

The edge-mountable apparatus (100) may include an engagement portion (300) configured to couple to an edge of a door or window, and a support portion (200) extending from the engagement portion, the support portion being configured to contact an adjacent surface so as to maintain the door or window in an open position and thereby permit airflow from an enclosed area defined by the door or window to an adjacent space. The edge-mountable apparatus (100) may have a lateral exterior surface area (600), a lateral interior surface area (500), a top surface area (400) and a bottom surface area (700). Some embodiments of the edge-mountable apparatus (100) may have at least 11 lateral exterior sides (601) (602) (603) (604) (605) (606) (607) (608) (609) (610) (611). Some embodiments of the edge-mountable apparatus may have at least 3 lateral interior sides (501) (502) (503).

In some embodiments, the edge-mountable apparatus (100) includes a lateral interior surface area (500) that defines a void space adapted to receive a hanging element, thereby enabling the apparatus (100) to be supported when not in active use. The void space is dimensioned and positioned to allow insertion of a wall-mounted protrusion, hook, or similar structure, such that the apparatus (100) can hang securely from the element in a non-operational state. Suspending the apparatus in this manner promotes drying by exposing multiple surface areas to ambient air circulation, thereby helping to reduce moisture retention and discourage microbial buildup. Alternatively, the apparatus may be hung in this position while the shower is in use, keeping it conveniently accessible and out of the way until redeployment is desired. In some embodiments, the edge-mountable apparatus (100) includes a single continuous lateral interior side wall that forms a closed shape such as circular, oval, or another suitable geometry configured to define a space for hanging the apparatus (100). This space may accommodate various types of hanging elements, including but not limited to wall-mounted protrusions, hooks, or pegs. When the apparatus (100) is not in use, this configuration enables it to be conveniently stored by suspending it on a hanging element inserted into the defined interior space.

In some embodiments, the edge-mountable apparatus (100) comprises a single continuous lateral interior side wall forming a closed geometric shape, such as a circular, oval, or other suitable contour. This continuous wall structure defines an interior space configured for hanging the apparatus (100) when not in use. The continuous design may enhance structural integrity and facilitate convenient storage by allowing the apparatus to be supported on a protruding element, such as a hook or wall-mounted peg, via the defined hanging space.

In some embodiments, prior to positioning the edge-mountable apparatus (100) on a shower door edge, the user may optionally squeegee or otherwise remove excess water from the surface of the door. Removing surface moisture before propping the door open can reduce the total water load on the glass, thereby facilitating faster evaporation, minimizing the formation of water spots or mineral buildup, and helping to preserve the visual clarity of the shower door. This optional step may be performed in conjunction with the apparatus (100) to enhance the effectiveness of the overall drying process enabled by the ventilation method. In some embodiments, the edge-mountable apparatus (100) is particularly suited for use with frameless or semi-frameless glass shower doors. The engagement portion (300) may be configured to couple to the edge of a glass door without the need for adhesives, fasteners, or permanent modifications. In some embodiments, the engagement portion (300) includes opposing inner surfaces that are spaced apart to define a slot configured to receive an edge of the glass door. The engagement portion having a first side comprising at least two spaced apart engagement members having opposing lateral sides, the opposing lateral sides of each engagement member being clarified as 604 and 606, as seen in the figures. The opposing inner surfaces may apply pressure to opposite sides of the glass edge, thereby gripping the glass without adhesives, fasteners, or permanent modifications. This pressure-based retention can be achieved through elastic deformation, frictional engagement, or a combination thereof, allowing the device to be removably secured to the door. The configuration allows the apparatus (100) to securely engage the smooth, narrow edge of a glass panel while minimizing the risk of damage or scratching.

In some embodiments, the edge-mountable apparatus (100) is configured to engage the edge of a door or window with sufficient retention force such that the apparatus remains suspended in place without contacting the floor, even when not supported by an adjacent surface. This engagement may be achieved through the geometry of the engagement portion (300), frictional fit, material flexibility, or a combination thereof, allowing the apparatus (100) to remain coupled to the edge without slipping or falling under its own weight.

In some embodiments the support portion (200), in turn, may extend from the engagement portion (300) and engage an adjacent surface, such as a wall, fixture, or glass panel, in a manner that holds the door or window ajar. When the apparatus (100) is used in this way, it creates a ventilation gap, preferably of at least two inches, between the door and its corresponding frame or wall.

In some embodiments, the top surface area and the bottom surface area are flat, which allows an individual to grip the apparatus more easily, particularly when the hands are wet. In some embodiments, the lateral exterior surface area is flat, thereby facilitating improved grip by an individual with wet hands. In some embodiments, the top surface area, bottom surface area, and lateral exterior surface area are flat, which enhances the ability of an individual to securely grip the apparatus, even when the hands are wet. As used in the context of this disclosure, a “flat surface area” refers to a surface that lies substantially in a single plane and lacks curvature or contour, such that no portion of the surface deviates materially from the plane. In some embodiments, the engagement portion is configured to grip the edge of a door or window via a friction or pressure fit, with the opposing lateral sides spaced apart to accommodate a variety of common edge thicknesses found in frameless glass shower doors and window panels. The grip may be strong enough to suspend the apparatus on the edge without additional support, such that the apparatus remains in place under its own weight.

This ventilation gap facilitates airflow between the interior of the shower enclosure and the surrounding room environment. Increased air circulation accelerates the evaporation of moisture present on the shower surfaces, including glass, tile, grout, and metal fixtures. As a result, the apparatus (100) helps to reduce the accumulation of mineral deposits prevent the formation of water spots and streaks on the glass, and inhibit the growth of mold and mildew caused by prolonged humidity. The apparatus (100) thus enhances drying efficiency and helps maintain the clarity and appearance of glass shower doors over time.

In addition to functional benefits, the apparatus (100) may be easily detached and stored when not in use. In some embodiments, a lateral interior surface area (500) comprising one or more lateral interior sides (501-503) may define a space for hanging the apparatus (100) on a hook or other protruding wall-mounted element for convenient storage. In some embodiments, the edge-mountable apparatus (100) includes an engagement portion (300) that is dimensioned and shaped to securely couple to the edge of a typical door or window, such as a frameless glass shower door. The engagement portion may employ friction, pressure-fit, or contoured alignment to ensure a firm hold. The support portion (200) may extend at an angle or perpendicularly from the engagement portion and contact an adjacent wall, tile, or other surface to maintain the door or window in a partially open position, thereby promoting airflow between interior and exterior environments.

The edge-mountable apparatus (100) may further include a top surface area (400), a bottom surface area (700), and a lateral exterior surface area (600) comprising a series of planar or curved sides, which collectively form the body of the apparatus. These surfaces define the overall geometry and physical interface with both the door and the adjacent structure.

In some embodiments, the lateral exterior surface area (600) comprises at least eleven lateral exterior sides (601-611), which may be joined at edges or vertices to form a complex prismatic structure for strength, aesthetics, or function.

In some embodiments the individual sides 601 through 611 may be clearly demarcated and defined to correspond with specific portions of the engagement and support structures, allowing precise manufacturing and visual distinction in drawings and use.

The engagement portion (300) may be defined by lateral exterior sides 601-608, which may wrap around or interface with the door edge to provide a stable grip. The support portion (200) may be defined by lateral exterior sides 609-611, which extend from the engagement portion to rest against an adjacent surface and support the apparatus in its propping configuration. Structural integrity and continuous geometry may be achieved by connecting lateral sides 601 and 611 to form a looped edge or structural reinforcement between the engagement and support portions, while sides 608 and 609 may serve as an angular transition between the two portions. To improve grip and edge retention, the engagement portion (300) may utilize at least two of the lateral exterior sides to engage opposite faces of the door or window edge. These faces may exert clamping pressure or form a slot into which the door edge is received.

Some embodiments include a lateral interior surface area (500) having at least one lateral interior side (501), defining an opening or cavity for optional hanging. The lateral interior surface area (500) may include a second (502) and third (503) lateral interior side that cooperate with side 501 to define a space suitable for engaging a protrusion or hanging element such as a hook mounted on a wall.

In different embodiments, the intersections between lateral exterior or lateral interior sides may form pointed ridged vertices (e.g., for structural definition or tactile feedback), rounded vertices (for safety and ergonomic handling), or a combination thereof. In certain embodiments, the hanging space defined by the interior sides may be located on the support portion (200), allowing convenient wall storage when the apparatus is not engaged with the door.

In some embodiments, the apparatus includes established lateral side surfaces that are generally flat or planar. These defined side surfaces assist the user in gripping and manipulating the apparatus, particularly in wet environments such as during or after a shower. The flat sides reduce rotational slippage and allow for a more stable grasp when hands are wet or soapy, thereby improving ease of use and safety.

In some embodiments, the apparatus is configured to maintain a door, particularly a glass shower door, in an open position such that a gap of at least two inches is formed between the door and frame. This gap promotes airflow, speeds up drying, and mitigates mildew or water stain formation.

A method of use involves placing the apparatus (100) adjacent a door or window edge, typically at the hinge side or handle edge of a frameless glass shower door. The engagement portion (300) is slid onto or pressed against the door edge, and the support portion (200) is adjusted until it makes contact with a nearby wall or ledge, thereby propping the door open.

The engagement portion may be pressed onto the door edge such that at least two lateral exterior sides contact opposing faces of the door, securing the apparatus in place without adhesives or fasteners. To create an effective ventilation gap, the support portion (200) may rest against a surface that holds the door open at least two inches from the frame. This gap has been found to be sufficient to allow meaningful air circulation that reduces drying time and discourages microbial growth.

After use, the user may detach the apparatus from the door edge and hang it on a wall or nearby protrusion. In some embodiments, the apparatus is suspended by inserting the hanging element such as a hook into the cavity defined by lateral interior sides 501, 502, and 503, allowing water to drain and the apparatus to dry while not in use.

As used in this application, the term glass door is intended to encompass not only doors made of glass, but also other substantially rigid, smooth-surfaced, and often transparent or translucent materials commonly used in residential or commercial shower enclosures and similar settings. These may include, but are not limited to, tempered glass doors, frosted glass doors, acrylic doors, polycarbonate doors, fiberglass-reinforced plastic (FRP) doors, composite resin panels, Plexiglass (PMMA) doors, laminated safety glass doors, and transparent or semi-transparent polymer doors.

In various embodiments, any reference to a glass door is meant to include any of the above door types, provided they have an edge structure capable of engaging with the apparatus. These materials share similar structural characteristics with traditional glass doors namely, a generally planar, rigid form with an accessible edge making them suitable substitutes for the purposes of coupling with the edge-mountable apparatus described herein.

As used herein, the term "adjacent" refers to a position that is next to, near, or in close proximity to another element, component, or surface, without necessarily being in direct contact therewith. The adjacency may include intervening structures unless otherwise specified.

The disclosed edge-mountable apparatus may be formed from a variety of materials suitable for providing structural support, durability, and moisture resistance. In certain embodiments, the apparatus may comprise a polymeric material such as acrylonitrile butadiene styrene (ABS), polycarbonate (PC), polypropylene (PP), polyvinyl chloride (PVC), nylon, or other thermoplastic or thermoset materials. In other embodiments, metallic materials such as aluminum, stainless steel, or other corrosion-resistant alloys may be employed. The gripping surfaces that contact the glass edge may include or be coated with elastomeric or resilient materials such as silicone, thermoplastic polyurethane (TPU), rubber, or equivalent cushioning materials to provide frictional engagement without damaging the glass. The apparatus may also be fabricated as a composite structure combining rigid and flexible materials through molding, overmolding, or other manufacturing techniques.

What is claimed is:

1. A door or window edge-mountable apparatus for maintaining a door or window in an open position, the apparatus comprising:

an engagement portion for engaging an edge of a door or window, the engagement portion having a first side comprising at least two spaced apart engagement members having opposing lateral sides, the engagement members configured to receive an edge of the door or window between them for contact with the opposing lateral sides, where the door or window having an adjacent frame; and a support portion connected to and extending from an end of the engagement portion opposite the first side, the support portion comprising three outward facing sides that form a triangular shape, the three outward facing sides converge to form a vertex, the vertex being the point at which the support portion is connected to the engagement portion;

wherein the support portion extends from the engagement portion in a generally perpendicular manner, the triangular shape of the support portion is configured such that when the engagement member is engaged with a door or window, at least one of the sides of the support portion is configured to abut the adjacent frame, such as to engage the adjacent frame to maintain the door or window in an open position and permit airflow between an enclosed area and an adjacent space, and wherein the vertex geometry inherently distributes contact forces received from the engagement portion along the adjoining sides of the support portion, thereby reducing localized pressure and the risk of damage to the door edge, frame, or another contacting surface.

2. The apparatus of claim 1, further comprising a top surface area, a bottom surface area, and a lateral exterior surface area, each of which is flat.

3. The apparatus of claim 1, having a lateral exterior surface area, wherein the lateral exterior surface area is flat.

4. The apparatus of claim 1, having a top surface area and a bottom surface area, wherein the top surface area and bottom surface area are flat.

5. The apparatus of claim 1, wherein the support portion has a defined space for hanging the apparatus.

6. The apparatus of claim 1, wherein the apparatus has vertices, each of which is ridged.

7. The apparatus of claim 1, wherein the apparatus has vertices, each of which is rounded.

8. The apparatus of claim 1, wherein the apparatus has vertices that include both rounded and ridged features.

* * * * *